2,990,335
FLUID SUSPENSION CULTURE METHOD FOR FIXED TISSUE CELLS
Wilton R. Earle, Burtonsville, and Virginia J. Evans, Chevy Chase, Md., Edward L. Schilling, McLean, Va., and Jay C. Bryant, Wheaton, Md., assignors to the United States of America as represented by the Secretary of Health, Education and Welfare
Filed May 6, 1955, Ser. No. 506,681
6 Claims. (Cl. 167—84.5)
(Granted under Title 35, U.S. Code (1952), sec. 266)

This invention relates to the proliferation of animal fixed tissue cells in vitro, and aims generally to improve the same.

Objects of the invention, severally and interdependently, are to provide methods and apparatus by which the proliferation of such animal fixed tissue cells may be carried out rapidly and in massive cultures in fluid suspension apart from substrates, methods and apparatus by which cell cultures derived from single animal fixed tissue cells by appropriate methods can be further proliferated in fluid suspension, and novel features and combinations of steps contributing to the realization of the foregoing objects.

The invention resides in the novel methods and apparatus, and in the sub-combinations and features thereof herein described, and is more particularly pointed out in the appended claims.

In previous methods for proliferation of fixed tissue cells, the cells have been grown in plasma clots, or on substrates, or on the glass walls of a roller tube. With sufficient viscosity of the nutrient solution, some of the groups of cells in the roller tube proliferation have become detached from the tube walls and have then existed in suspension. Also, during transfer between growth cycles, groups of cells scraped from the substrate or tube wall have been stirred in suspension before inoculation of new cultures, and have become attached to and proliferated on the substrates in the new cultures as before.

The present invention, however, goes beyond such prior practices and employs swirl-type rotary shaking in a manner that enables the animal fixed tissue cells to proliferate in suspension.

This new method is preferably practiced with apparatus exemplified in the accompanying drawings, in which:

FIG. 1A is a detail to an enlarged scale showing an advantageous mode of mounting the culture container means therein.

Figure 1:
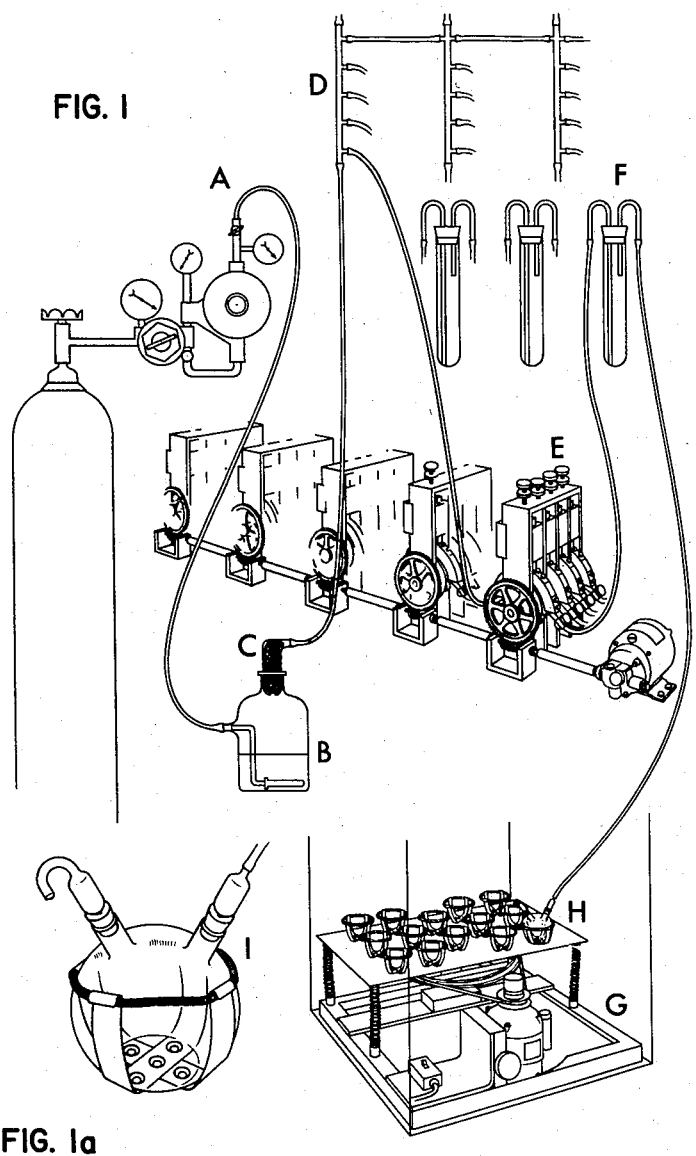
FIG. 1 is a diagram in perspective of such apparatus.

Before proceeding to the particular examples of the present method, the apparatus shown in FIGS. 1 and 1A will be described. This apparatus comprises, in the form shown, suitable reducing valves and gauges A for controlling the supply of a mixture of 5 to 10% $CO_2$ in air from a cylinder under pressure; a humidifier B for saturating the gas so supplied with water vapor, preferably also containing 3% sulfuric acid or some other non-volatile antiseptic for sterilizing the gases, means such as an enclosed body of glass beads C for intercepting any entrained liquid droplets from the gas passing from the humidifier B, and which delivers to a manifold D; metering pump means E, each of which comprises, in the form shown a worm wheel driven from a driving motor through a worm gear, the wheel shaft carrying peripherally spaced rollers that roll with collapsing pressure along an arcuate section of rubber tubing lying against an arcuate wall shiftable to regulate the point of gas entrapment for trapping measured quantities of the gas therein and expelling it to a flow indicator, shown as a bubble counter "F" which may contain non-volatile antiseptic, for example, from which the supernatant gas passes to and through the culture vessels I (FIG. 1A). The culture vessels I (FIG. 1A) are of any suitable form and are preferably secured in position on the platform H of a shaker table G, hereinafter described in more detail. The culture vessels I may take various forms but preferably are provided with gas inlet and outlet means as shown, the inlet means being connected through a cotton-packed bacteria trap and a flexible rubber tube with the gas outlet of a flow indicator F. The gas outlet of the culture flask or vessel I is also preferably provided with a cotton packed bacteria trap, as shown in FIG. 1A. The gas inlet or outlet means may be disconnected for introducing culture and culture medium into the vessel I or removing it therefrom, or a separate, larger stopperable neck may be used for such purpose.

Turning now to the present method:

To determine whether, under proper conditions, equipment designed for use in the antibiotics industry, or a modification thereof, could be employed for the growth of animal fixed tissue cells to avoid the limitations of roller tube culture, a New Brunswick type shaker was employed. Such shaker is available from the New Brunswick Instrument Co., New Brunswick, N.J., and comprises a spring mounted platform bearing a number of flask retainers and capable of being oscillated in a circular horizontal path by a motor and eccentric drive, as illustrated at the lower right in FIG. 1, for causing liquid bodies contained in the retained flasks to be agitated with a swirling motion therein. This shaker was mounted in an incubator. In different experiments carried out in this laboratory this shaker was adjusted to shake at between 4800 and 14,000 revolutions per hour. On this shaker to date, using the fluid culture medium employed in Example 1 hereinafter, and also using other fluid culture media both augmented and not augmented in viscosity, we have successfully grown a number of strains of fixed tissue cells, including strain L (#929) fibroblasts, FIGS. 2 and 3; cells of a pure strain (#1469) of mouse liver epithelium in fluid suspension, FIG. 4; and strains of HeLa (above identified) FIGS. 5 and 6; all without benefit of solid substrates; as will now be set forth, using incubation at 37.5° C.

*Example 1 (FIG. 2)*

Figure 2:
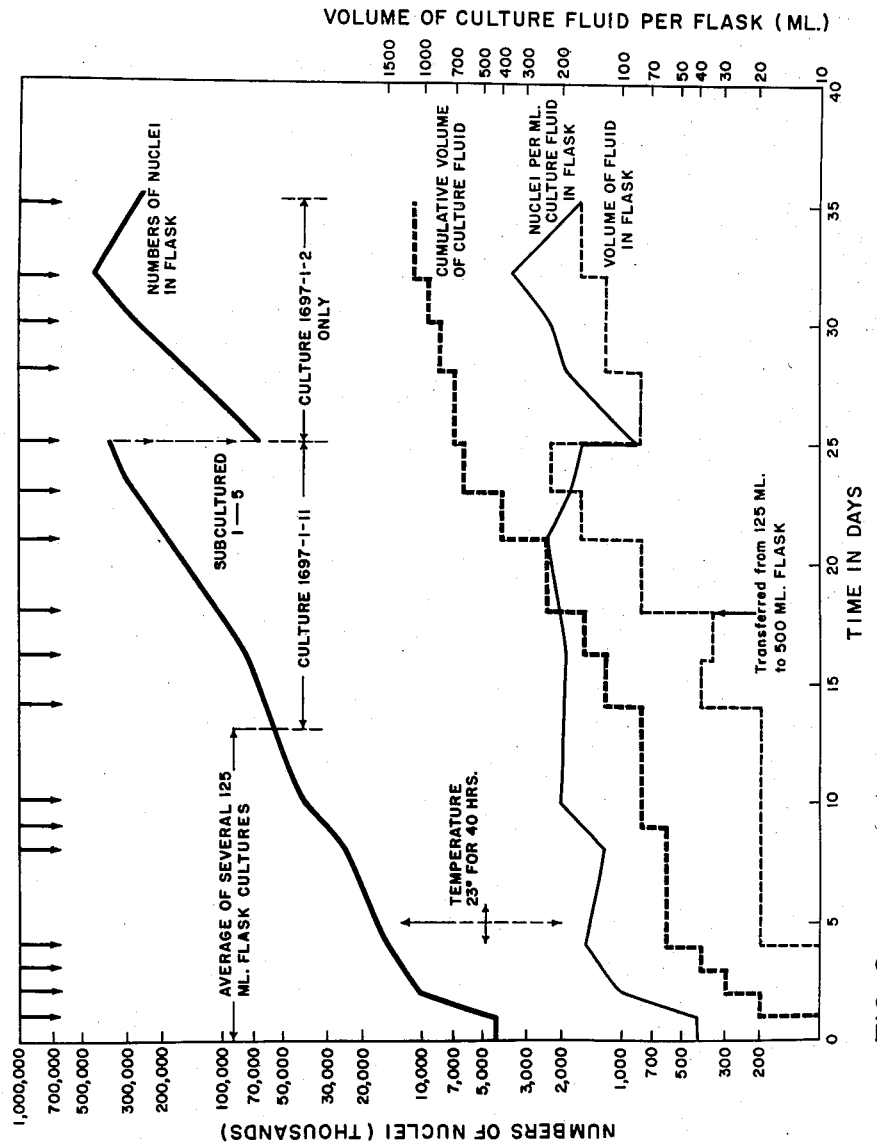
FIG. 2 is a chart (13711) showing the proliferation of strain L (#929) fibroblasts in fluid suspension by the present method.

In the example of FIG. 2, employing strain L (#929) fibroblasts, cultures were each started with cells equivalent to 4,200,000 nuclei suspended in 10 ml. of the usual fluid culture medium of dilute horse-serum and chick-embryo extract, and with the viscosity thereof slightly raised by the addition thereto of a low concentration of methyl cellulose, of which 0.1%, found highly satisfactory, was used in this example. Each culture was contained in a 125 ml. Erlenmeyer flask. Thrice weekly the cell suspension was lightly centrifuged, most of the supernatant removed and replaced with fresh fluid nutrient. As the volume of fluid increased the culture was removed to a larger flask until by the end of 25 days the 300 ml. of cell suspension was contained in a 1 liter flat bottom boiling flask. At this time enumeration of an aliquot showed the culture contained approximately 370 million nuclei.

At 25 days this culture was subdivided into 5 cultures which were each started in 80 ml. of nutrient. This subdivision therefore started each daughter culture with cells equivalent to 72 million nuclei. Some of these cultures were closed out for study but those which were run on were each proliferated to cells equivalent to 400 million nuclei, or an estimated wet weight of more than 1.5 grams wet weight of cells each, in 7 days.

The rapidity and quantity of proliferation obtained, and the great economy in use of culture fluid to obtain the same, are particularly noteworthy, and from the chart FIG. 2, it will be apparent that the system of proliferation exemplified is highly efficient in building up large populations of cells, and may be extrapolated to almost any extent desired when economical and practical nutrients are available in sufficient quantities. A shaker speed of 7200 r.p.h. was employed in this example.

Figure 3:
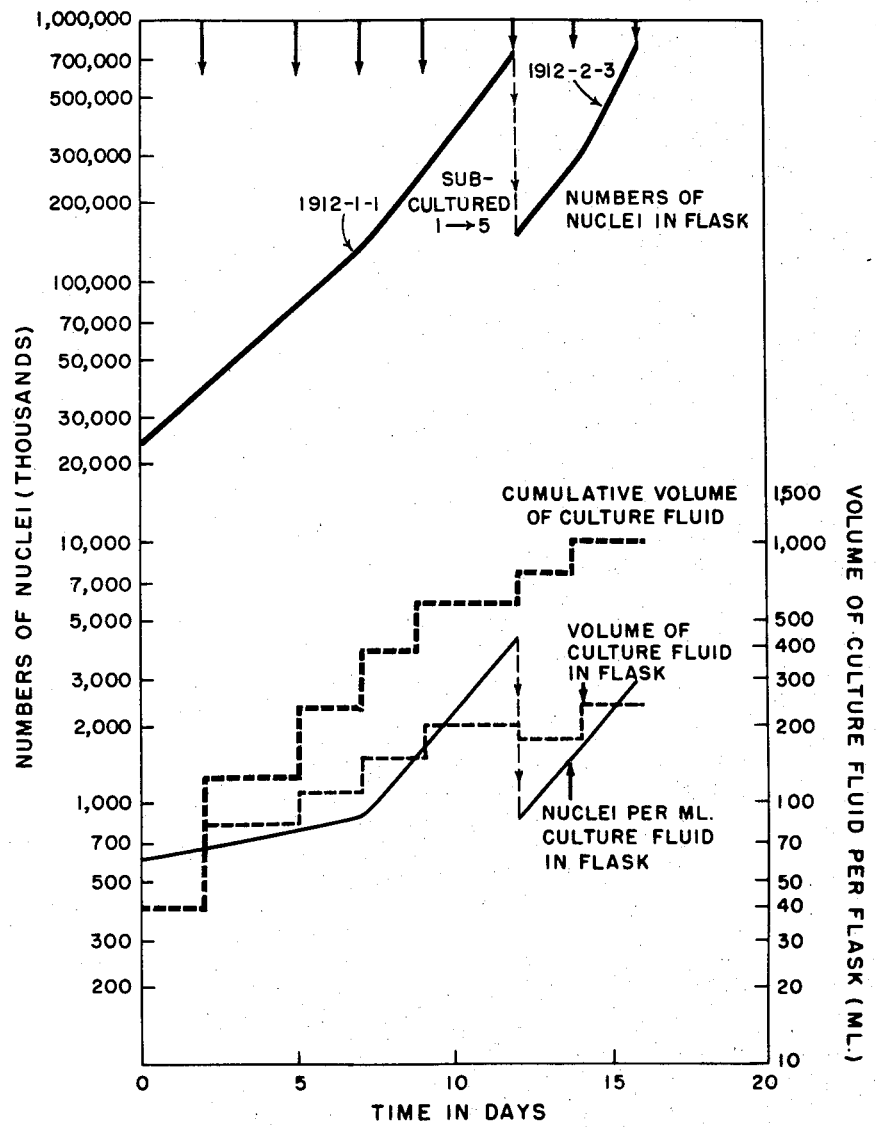
FIG. 3 is a chart (#13710) illustrating another example of the proliferation of cells of said strain.

Example 2 (FIG. 3)

In the example of FIG. 3, again the equipment in FIG. 1 was used, with culture medium like that employed in Example 1.

Starting with 25,000,000 cells of liver strain 1469 from T-flask cultures, in about 40 ml. of culture medium (a population density of about 600,000 cells per milliliter), proliferation on the shaker table was continued for two days. The culture was then transferred to a centrifuge flask and lightly centrifuged, and the supernatant liquid was withdrawn and replaced by sufficient fresh nutrient medium to make about 70 ml., containing about 800,000 cells per milliliter. These steps were then repeated, with increase of the quantity of culture medium, after the 5th, 7th, 9th and 12th days of proliferation. This procedure in 12 days yielded about 700,000,000 cells (a 28 fold increase) in about 200 ml. of culture fluid, from a cumulative volume of culture fluid used of less than 800 cc. The 700,000,000 cells (about 2.8 grams wet weight) were then divided into five cultures that were subjected to the same procedure in two day steps. In four days each of the sub-cultures had attained a population of over 700,000,000 cells. Thus a further five fold increase was obtained in 4 days, or greater than a doubling every two days, with extreme economy of culture medium. A shaker speed of 12,600 r.p.h. was used in this example.

Figure 4:
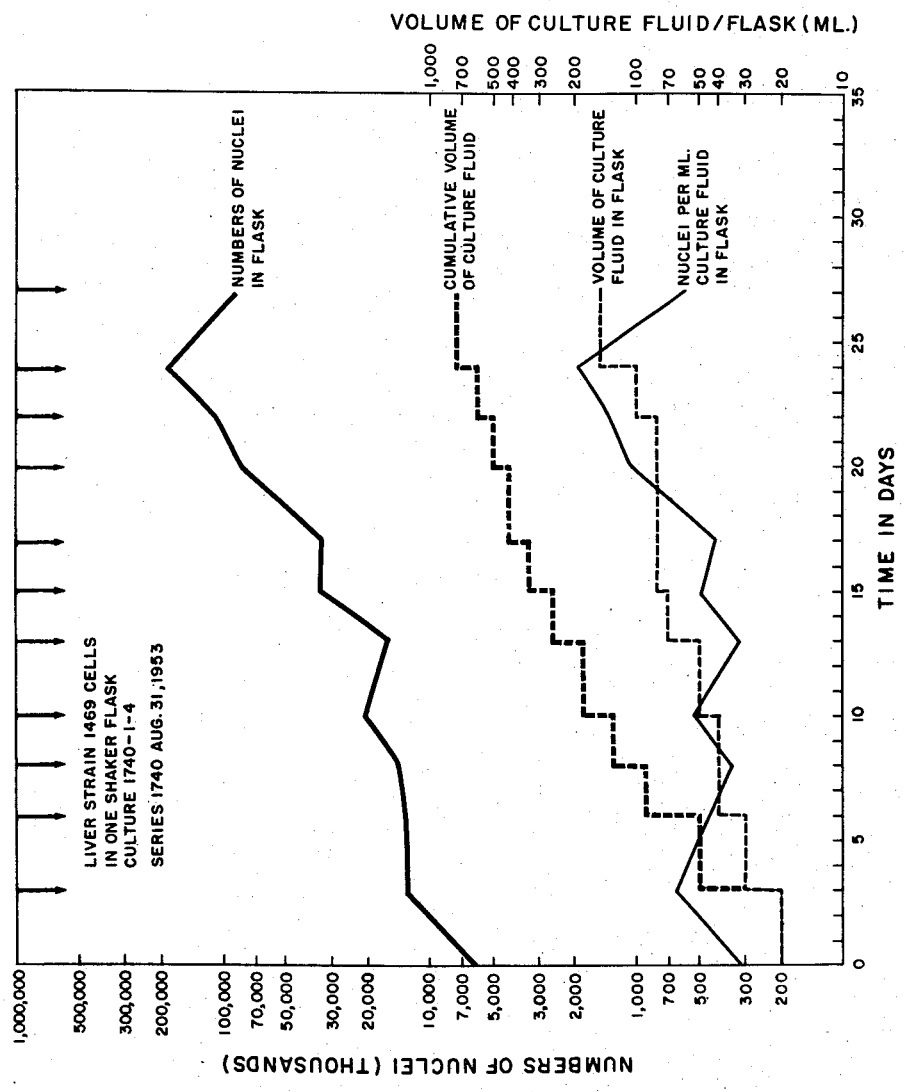
FIG. 4 is a chart (#13709) showing proliferation of pure strain #1469 cells of mouse liver epithelium in fluid suspension by the present method.

Example 3 (FIG. 4)

Example 3 is of the proliferation of liver cells, strain 1469, using the same equipment and the same nutrient fluid, but without viscosity augmentation, as the culture medium. In this example, proliferation in suspension was initiated with approximately 6,000,000 cells in 20 ml. of culture fluid, a density of approximately 300,000 cells per ml. The light centrifuging, and replacement and augmenting of the quantity of culture fluid was effected approximately thrice weekly as indicated on the chart. As shown by the lower solid curve, after about the 18th day the augmentation of nutrient was curtailed and the population density, i.e. number of nuclei per ml. of culture fluid was allowed to build up to over a million. On the 24th day, at which the population density was about 2,000,000 cells per milliliter, addition of fresh nutrient was discontinued in an attempt to determine how exhaustion of the medium would affect the culture. As may be seen from the upper solid line curve under these conditions cell deaths exceeded cell divisions, and the number of living cells in the flask retrogressed. This example illustrates the successful proliferation of fixed tissue cells in suspension without augmentation of the viscosity of the culture medium. The shaker was operated at 7200 r.p.h. during this example.

Figure 5:
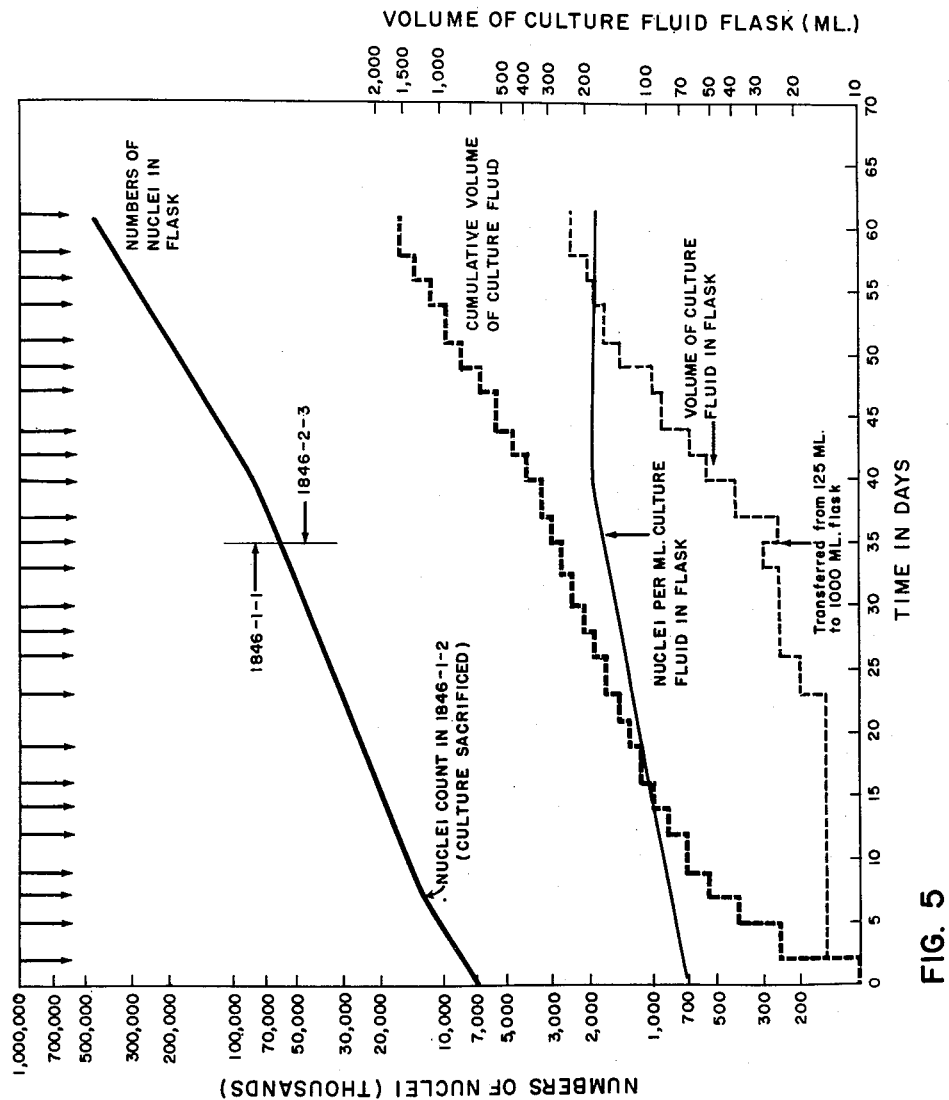
FIG. 5 is a chart (#13712) showing luxuriant proliferation by the present method of HeLa cells (human malignancy from the epithelium of the cervix of the uterus) currently employed in diagnosis of poliomyelitis.

Example 4 (FIG. 5)

In this example, HeLa cells were proliferated. Here the culture was started with 7,000,000 cells, obtained from T-flask culture, in 10 ml. of non-viscosified nutrient culture medium consisting of a mixture of dilute human serum and chick embryo extract, the population density being 700,000 per ml. Light centrifuging and renewal and augmenting of the culture fluid was conducted as in the preceding examples up to 61 days, as indicated. In this example the population density was run up to nearly 2,000,000 nuclei per ml., and held approximately at that figure, after the culture had attained a volume of 25 to 30 ml. and had been transferred to a 1000 ml. flask. In this larger flask, with larger swirls and a larger surface of the culture exposed to the 5% $CO_2$ in air mixture, the number of nuclei increased even more rapidly at the dense population level than it had before, and a population of nearly 500,000,000 cells were obtained, in a single flask, in 61 days, about 70 times the initial population. Such massive, rapid, and economical proliferation is especially noteworthy since the HeLa cultures are important for diagnosis of poliomyelitis, and in the hands of many workers have proven notoriously difficult to routinely grow in conventional type cultures. The shaker was also operated at 7200 r.p.h. in this example.

Figure 6:
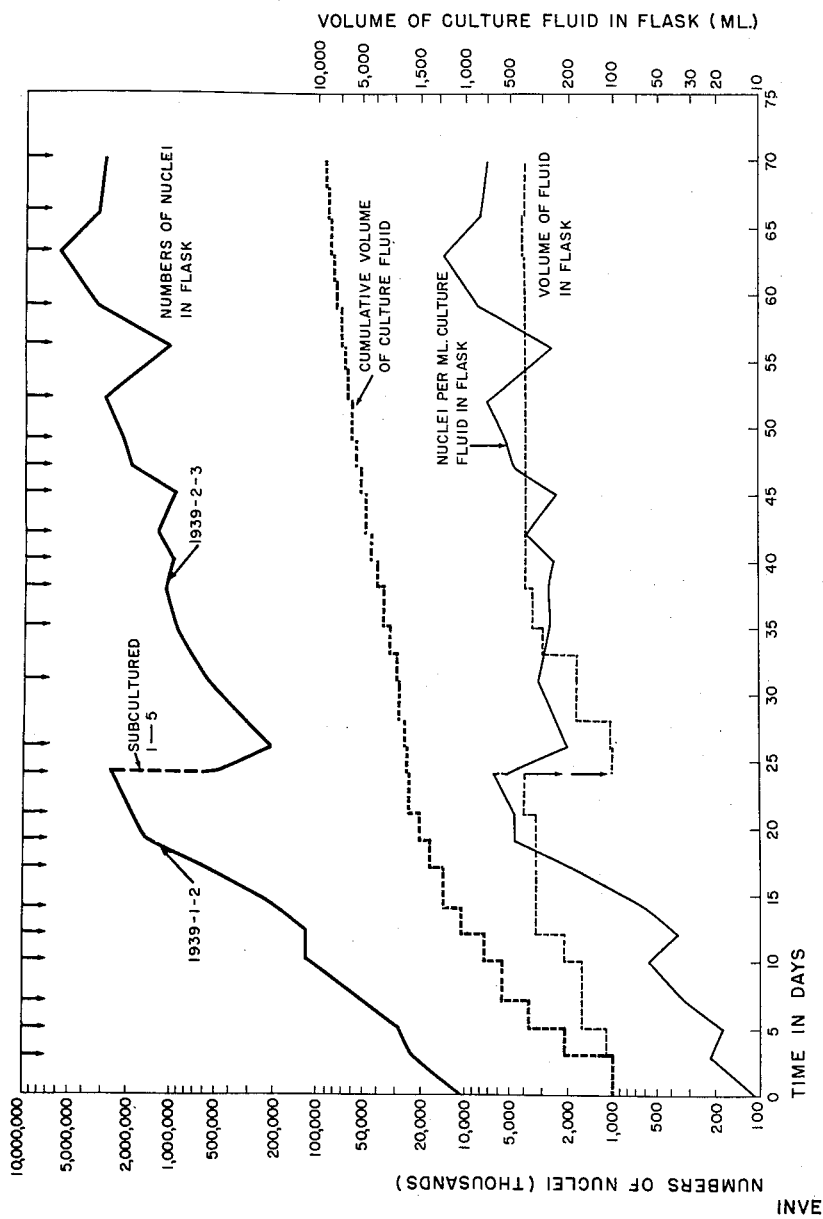
FIG. 6 is a chart illustrating another example of proliferation of such HeLa cells.

Example 5 (FIG. 6)

As a final example, HeLa was again proliferated with the equipment of FIG. 1 and using a different non-viscosified culture medium consisting of approximately 40% human serum with 20% of whole egg ultra filtrate, and 40% Earle's balanced saline. A shaker speed of 12,600 r.p.h. was used throughout this example. The start was made with approximately 10,000,000 nuclei in 100 ml. of culture medium, a population density of about 100,000 per ml. The same method was followed, and near the 20th day the population density was permitted to substantially exceed 2,000,000 per ml. At the 24th day, with a total population of nearly $3(10)^9$ cells the culture was divided into 5 cultures each containing about $6(10)^8$ nuclei, but without materially reducing the population density. A retrogression in the number of nuclei followed, but when the population density was about $2(10)^6$ nuclei per ml., good proliferation again set in, with a continued gradual rise until an ultimate total population at 61 days reached over $6(10)^9$ cells in each sub-culture.

In this example, the drop in population after the 63rd day is attributed to overcrowding of the cells in the volume of fluid used, within the transfer interval used. It is apparent that further sub-culturing would have allowed the cells in this example to be proliferated indefinitely.

The extreme significance of these results is emphasized by the fact that cultures of this HeLa cell are now in routine use throughout the United States in the diagnosis of poliomyelitis and by the fact that the population of the cultures obtained in this example was manifold greater than it has been possible to obtain in any solid-substrate culture by conventional methods.

The examples set forth herein are of cultures in which the old culture fluid has been removed and replaced by fresh culture fluid at periodic intervals; however the invention is not limited to such batchwise procedure and contemplates continuous addition or substitution of fresh culture fluid as an obvious alternative procedure, associated with continuous or periodic removal of cells from the culture.

The invention further contemplates that the product desired may be either the proliferated cells or some product resulting from the alteration of some constituent of the culture medium by the cells; that various velocities of agitation may be employed, with or without augmentation of the viscosity of the culture medium, depending on the relative fragility of the cells being proliferated; and that when secretory cells (say of the anterior pituitary gland) are being proliferated, two cycles may be employed, one for proliferation with a growth promoting nutrient culture medium, and one with a secretion promoting culture medium containing sufficient nutrient to maintain the population and prevent retrogression as encountered in Example 4.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

We claim:

1. A method of proliferation of animal fixed tissue cells in suspension that comprises preparing a body of liquid culture medium containing cell nutrient in solution, inoculating said body with animal fixed tissue cells pre-suspended in culture medium in a quantity producing a population of the order of 400,000 to 1,000,000 cells per milliliter of the resulting culture, maintaining the culture at a temperature of about 37.5° C. and approximately atmospheric pressure, and substantially continuously agitating the inoculated culture medium by swirling it about in a container while circulating in contact therewith an atmosphere continuously maintained at approximately 5% $CO_2$ in air.

2. A method of proliferation of animal fixed tissue cells according to claim 1, further comprising the step of increasing the amount of culture medium as the cells proliferate by lightly centrifuging the culture and replacing a portion of the supernatant culture medium with fresh nutrient containing culture medium in a quantity commensurate with the proliferation of the cells.

3. A method of proliferation of animal fixed tissue cells according to claim 2, further comprising the step of subdividing the culture when the proliferation has repeatedly doubled the number of cells from about 3½ to 7 times.

4. A method of proliferation of animal fixed tissue cells according to claim 1 in which the culture medium is swirled at a rate of 4000 to 13,000 oscillations per hour.

5. A method of proliferation of animal fixed tissue cells according to claim 1, in which the inoculated culture medium is agitated by swirling it about the bottom portions of a container oscillated in a horizontal circular path.

6. A method of proliferation of animal fixed tissue cells in suspension that comprises preparing a body of liquid culture medium containing cell nutrient in solution, inoculating said body with animal fixed tissue cells pre-suspended in culture medium in a quantity producing an initial population of at least about 300,000 cells per milliliter of the resulting culture, maintaining the culture at about natural environmental body temperature for the cells concerned and at approximately atmospheric pressure, and continuously agitating the tissue culture by propelling the culture medium into a substantially continuous swirl rotating about a vertical axis during the period of proliferation while maintaining in exchange contact with the moving exposed surface of the culture medium an atmosphere continuously maintained at a concentration of carbon dioxide in air that maintains the culture medium at a pH within the physiological range.

References Cited in the file of this patent

Earle, J.: National Cancer Inst., April 1954, vol. 14, No. 5, pages 1159–1170.

Owens et al.: Proc. Am. Assn. Can. Res., vol. 1, page 41, 1953, Science.

Duran-Reynals: Jan. 11, 1952, pages 40 and 41.

Miller: Proc. Soc. Exptl. Biol. and Med., vol. 82, No. 3, March 1952, pages 450–454.

Chang: Proc. Soc. Exp. Biol. and Med., vol. 87, No. 2, pages 440–443.

Evans et al.: J. Nat. Cancer Inst., pages 907–926, 1951.

Tullis: "Blood Cells and Plasma Proteins, Their State in Nature," pages 276–279, pub. 1953 by Academic Press Inc., N.Y.C.

Warburg: The Metabolism of Tumors, 1930, pp. 82–84, 89–93 and 104–112.